April 7, 1970  C. W. DEE  3,504,987
GAS BEARING ROTORS
Filed Nov. 20, 1967
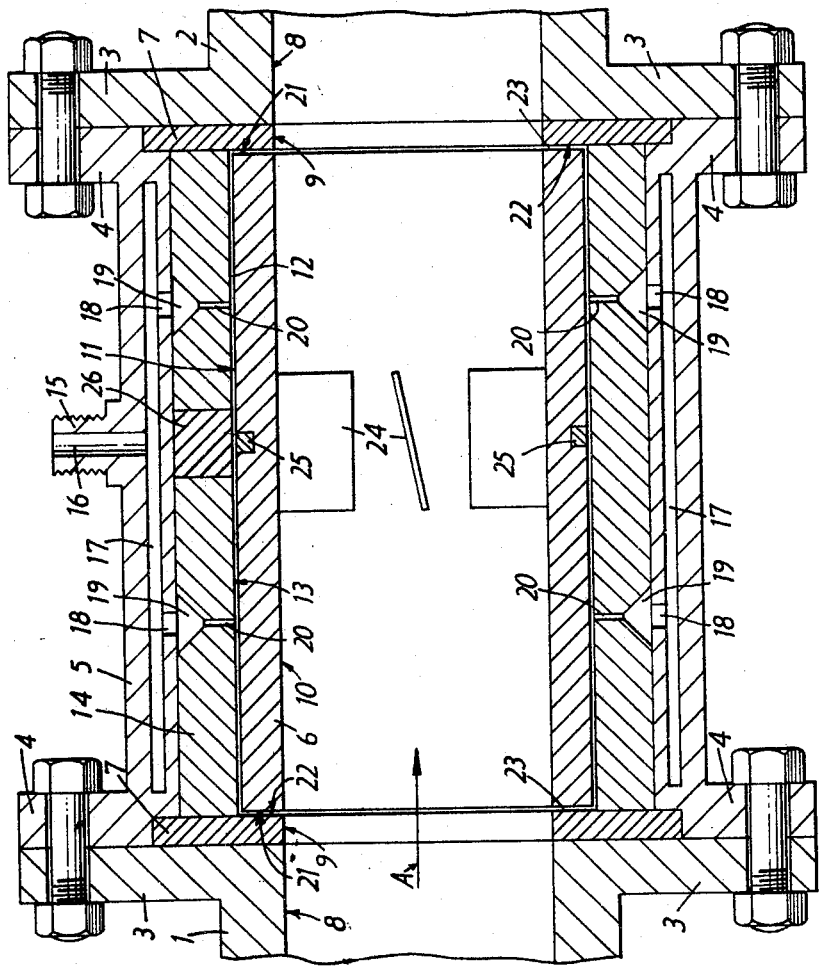
INVENTOR:
COLIN W. DEE United States Patent Office 3,504,987
Patented Apr. 7, 1970

3,504,987
GAS BEARING ROTORS
Colin W. Dee, Bournemouth, England, assignor to Gilbert Colin Davis, Johannesburg, Transvaal, Republic of South Africa
Continuation-in-part of application Ser. No. 680,405, Nov. 3, 1967. This application Nov. 20, 1967, Ser. No. 684,317
Claims priority, application Great Britain, Nov. 23, 1966, 52,455/66
Int. Cl. F01d 15/06; G01f 1/00
U.S. Cl. 415—91          4 Claims

ABSTRACT OF THE DISCLOSURE

This invention relates to devices of the kind in which a hollow first member is carried by fluid bearing means within a second member, its object being to provide improvements resulting in particularly low frictional losses.

---

This application is a continuation-in-part of my copending applications Ser. No. 557,230 filed June 13, 1966, now U. S. Patent No. 3,427,879, Ser. No. 557,231 filed June 13, 1966, Ser. No. 635,741 filed May 3, 1967, now U. S. Patent No. 3,437,387, Ser. No. 641,876 filed May 29, 1967, now U. S. Patent No. 3,446,150 and Ser. No. 680,405 filed Nov. 3, 1967.

According to the present invention, a device comprises a stationary member having an internal surface constituting the outer bounding wall of a fluid bearing, a tubular hollow movable member disposed within the stationary member and having an external surface constituting the inner bounding wall of said fluid bearing, whereby the fluid bearing is disposed radially outwardly of the through flow passage of the tubular hollow member, and means within the tubular hollow member to coact with fluid flow through the movable member.

The response of the movable member to forces or torques may be either motion, linear or rotational, or creation of reaction forces upon constraining members, opposed by mechanical, hydrostatic, magnetic or electrical means.

In a first form, the stationary member is a housing and the movable member is capable of linear motion with relations to and within the stationary member.

In the context, the term "fluid bearing" is intended to refer both to gas-fed bearings and to liquid-fed bearings.

In another form, the stationary member is a stator and the movable member is a rotor, the fluid bearing then being a journal bearing. The respective surfaces of the stator and rotor may be shaped so as to provide only one or more journal bearings, or so as to provide only journal bearing means and axial thrust bearing means. Alternatively, the stator and rotor may have still other surfaces which together define one or a pair of fluid axial thrust bearings.

Where a combination of journal bearings means and axial thrust bearing means is provided, these may be fed with fluid from a source through feed channel means in the stator common to both bearing means. Alternatively the axial thrust bearings may be fed by bleed from the journal bearing. The or each such axial-thrust bearing may exhaust into the through flow passage.

In order to facilitate understanding of the invention, an embodiment of fluid flow meter in accordance therewith is hereinafter described with reference to the accompanying drawing, which is an axial section.

In the fluid flow meter illustration a flow path for fluid in the direction of arrow A, is defined by a conduit having two parts 1 and 2 with flanges 3 to which are bolted flanges 4 of a stator 5. The parts 1 and 2 of the conduit are aligned, and between them there is provided an intermediate continuation formed by a tubular rotor 6 and a pair of end rings 7 fixed in the stator 5. The bores 8 of the conduit portions and the inside circumferences 9 of the rings 7 are cylindrical and of the same radius, and the through-passage 10 of the tubular rotor is likewise cylindrical and of the same radius, so as to form at each end a smooth stepless continuation of the bores of the conduit portions.

The rotor 5 is a plain thin-walled cylindrical tube, and its outer cylindrical surface 11 forms one of the two surfaces defining a fluid bearing gap 12. The other of the two surfaces defining the gap 12 is the inside circumference 13 of a member 14 secured in the stator. The stator 5 carries an inlet union 15 the passage 16 of which communicates with an annular passage 17 from which two series of angularly spaced radial holes 18 lead to annular channels 19. From the channels 19 there are provided respective angularly spaced feed passages 20 leading to the fluid bearing gap 12, whereby fluid under pressure can be fed to the gap 12 to support the rotor in the stator.

At each end of the rotor 6 there are radial end surfaces 21 and these coact with radial wall surfaces 22 of the stator to define axial end-thrust bearing gaps 23. The gaps 23 at each end of the rotor are fed with fluid by bleed from the journal bearing gap 12. The end thrust gaps 23 exhaust into the main fluid flow conduit.

The rotor 6 carries, within its through-flow passage, a set of four inclined vanes 24 to coact with the main fluid flow and cause the rotor to be driven in rotation. The rotor 6 also carries a series of magnetic elements 25 spaced at equal angular intervals about its circumference and adapted to create electrical signals in an electromagnetic coil 26 housed in the rotor, whereby the speed of rotation can be determined.

Such an arrangement provides a flow meter in which the main fluid flow passage is smooth, stepless and of constant bore throughout. The rotor is carried by bearings which are disposed wholly radially outwards of the main fluid flow and are very nearly friction-free. The vanes 24 carried by the rotor 6 are designed solely with a view to coacting with the fluid flow in a turbulence-free manner.

I claim:
1. A rotary device comprising:
(a) a stator for inclusion in a fluid flow conduit, said stator including a pair of axially-spaced end elements each having a coaxial cylindrical bore of the same diameter and an intermediate element disposed between said end elements and having a coaxial cylindrical bore of a greater diameter than that of the end elements;
(b) a tubular rotor disposed wholly radially within the intermediate element of the stator and axially between the spaced end elements of the stator, said rotor having an internal coaxial cylindrical bore of the same diameter as the end elements and an external coaxial cylindrical surface which defines with the bore of the intermediate element a cylindrical fluid journal bearing gap;

(c) means within the tubular rotor to coact with fluid flow through the rotor.

2. A rotary device, as claimed in claim 1, wherein the tubular rotor has a radial end face at each end, and each such end face is spaced from a radial face of the adjacent end element of the stator, thereby to define a fluid axial-thrust bearing gap at each end of the rotor.

3. A rotary device, as claimed in claim 2, wherein the stator includes first passage means for feeding fluid under pressure to the journal bearing gap, and second passage means for feeding fluid under pressure to both of the axial-thrust bearing gaps.

4. A rotary device, as claimed in claim 2, wherein the journal bearing gap communicates at each end with the respective axial-thrust bearing gap, whereby said axial-thrust bearing gaps are fed with fluid under pressure by bleed from the journal bearing gap.

References Cited

UNITED STATES PATENTS

| 930,851 | 8/1909 | De Ferranti. |
|---|---|---|
| 1,906,715 | 5/1933 | Penick. |
| 2,605,619 | 8/1952 | Serduke. |
| 3,383,805 | 5/1968 | Powell. |

FOREIGN PATENTS

| 1,259,771 | 3/1961 | France. |
|---|---|---|
| 1,485,830 | 5/1967 | France. |
| 945,366 | 12/1963 | Great Britain. |

E. A. POWELL, Jr. Primary Examiner

U.S. Cl. X.R.

73—231; 415—104, 170, 503